United States Patent [19]

Onishi et al.

[11] Patent Number: 4,840,552
[45] Date of Patent: Jun. 20, 1989

[54] APPARATUS FOR CONTINUOUSLY PRODUCING HEAT-SHRINKABLE CROSSLINKED RESIN TUBE

[75] Inventors: Akihumi Onishi; Masakasu Hasegawa; Michio Takaoka; Tsuneaki Motai; Motoyuki Ono; Shotaro Yoshida, all of Tokyo, Japan

[73] Assignee: Fujikura Ltd., Tokyo, Japan

[21] Appl. No.: 70,784

[22] Filed: Jul. 7, 1987

[51] Int. Cl.$^4$ .......................................... B29C 47/88
[52] U.S. Cl. .............................. 425/72.1; 264/209.3; 264/567; 425/94; 425/325; 425/326.1
[58] Field of Search ................ 425/72.1, 325, 326.1, 425/327.387.1, 94; 264/209.6, 567, 211.12, 209.3–209.5, 210.2, 201.3, 211.13

[56] References Cited

U.S. PATENT DOCUMENTS

| | | | |
|---|---|---|---|
| 3,069,727 | 12/1962 | Shramek | 264/209.6 X |
| 3,221,084 | 11/1965 | Peticolas | 425/72.1 X |
| 3,231,652 | 1/1966 | Goldman | 264/567 |
| 3,311,679 | 3/1967 | Moore | 264/567 X |
| 3,608,019 | 9/1971 | Sato et al. | 264/567 X |
| 3,853,448 | 12/1974 | Yazawa | 425/72.1 X |
| 4,022,558 | 5/1977 | Herrington | 425/72.1 |
| 4,265,853 | 5/1981 | Havens | 425/72.1 X |

FOREIGN PATENT DOCUMENTS

47-19356  6/1972  Japan ..................... 425/325

Primary Examiner—Richard L. Chiesa
Attorney, Agent, or Firm—Oliff & Berridge

[57] ABSTRACT

An apparatus for continuously producing a heat-shrinkable crosslinked resin tube from a crosslinkable resin is provided, comprising in successive connection, an extruder head for extruding the resin into a hollow tube, a fluid under pressure being introduced into the interior of the tube being extruded, a crosslinking cylinder disposed downstream of the head for heating the tubular resin for crosslinking, a flare die disposed downstream thereof for allowing the tube to expand under the fluid pressure, a cooling cylinder disposed downstream thereof for cooling the tube, a guide for deforming the tube into a flattened form, and rollers for pressing and drawing the tube away from the extruder head, wherein a smooth interior surface free of a substantial gap or step extends continuously from the crosslinking cylinder to the cooling cylinder.

11 Claims, 9 Drawing Sheets

APPARATUS FOR CONTINUOUSLY PRODUCING HEAT-SHRINKABLE CROSSLINKED RESIN TUBE

BACKGROUND OF THE INVENTION

This invention relates to an apparatus for continuously producing a heat-shrinkable crosslinked resin tube suitable for use in covering junctions in various pipe lines and cables as well as shielding various pipes and rods for corrosion prevention and heat insulation purposes. More particularly, it relates to an apparatus for continuously producing such a heat-shrinkable tube from a crosslinkable resin composition.

For the purposes of rust protection or heat insulation of junctions in lining steel pipes used in petroleum, gas, city water, chemical plant and other applications, or junctions in protective steel pipes used in electrical power cables and telecommunication cables, it has been a common practice to use a heat-shrinkable tube which can be shrunk by heating to cover the associated junction in a close sealing relationship. The heat-shrinkable tubes are tubes wherein molecular anisotropy is established by a structural change due to deformation of a heat-fusible polar chain high molecular weight compound and which utilize the phenomeon that the once established orientation is destroyed upon reheating to resume the original state. Various synthetic resins are used in the manufacture of such heat-shrinkable tubes and among them, crosslinkable synthetic resins such as crosslinkable polyethylene are now of most interest.

Continuous manufacture of such a heat-shrinkable crosslinked tube is known as described in Japanese Patent Publication No. 47-19356. The process uses a metal insert such as an aluminum pipe having a plurality of small perforations in the pipe wall. A crosslinkable resin compound is extrusion coated on the insert and the coated insert is then successively passed through crosslinking, expanding and cooling chambers whereby crosslinking is effected in the crosslinking chamber, and the resinous tube on the insert is then expanded by controlling the internal and external pressures of the tube in the expanding chamber. The tube in expanded form is cooled in the cooling chamber and then wound on a suitable take-up roll.

The above-mentioned prior art process uses a metal insert on which resin is extrusion coated. The use of a metal insert adds to the manufacturing cost. The metal insert must be finally removed from the surrounding resin tube, requiring a cumbersome operation. It is practically difficult or impossible to take up the tube in roll form without removing the metal insert. Therefore, the process is rather impracticable or commercially feasible with difficulty in the continuous manufacture of a heat-shrinkable tube.

In the prior art process, the resinous tube on the metal insert is expanded by controlling the pressures internal and external to the tube in the expanding chamber. The tube is kept free in the expanding chamber. No provision is made such that the outside surface of the expanded resin tube is positively supported. As a result, any slight unbalance between the internal and external pressures would cause excess or short expansion. The tube may crease in the cooling chamber as a result of an excessively increased diameter due to excessive expansion. This constitutes another factor of preventing the prior art process from being applied to commercial continuous manufacture of a heat-shrinkable tube.

A heat-shrinkable tube is generally fabricated from a crosslinkable resin composition by extruding the composition in a tubular form and continuously heating the tube in a crosslinking cylinder to effect crosslinking. The crosslinking cylinder commonly used is a cylinder whose interior wall surface is of such metal as stainless steel. The resin of the extruded tube may often be seized or adhered to the interior surface of the crosslinking cylinder. Lubricant oil is generally supplied between the extruded tube and the crosslinking cylinder inside surface for the purpose of reducing the friction therebetween to prevent resin seizing. Certain lubricant oils fail to provide lubrication because some constituents in the oil can react with the crosslinking agent in the resin composition, or some constituents in the oil can undesirably deteriorate the resin composition. The use of lubricant oil suffers from another problem that it can not be always fully distributed over the entire inside surface of the cross-linking cylinder, giving rise to lubricant losses which cause seizing. It is thus desired to develop a method capable of preventing seizing during crosslinking without resorting to the use of lubricant oil.

Generally, in the manufacture of a heat-shrinkable tube, heat shrinkability is imparted to the tube by expanding or increasing the diameter of the tube at a temperature of lower than the crosslinking temperature, but higher than the softening temperature at the end of crosslinking, and cooling the tube to a temperature sufficiently lower than the softening temperature while maintaining the diameter unchanged. When the prior art process as described above is practiced, the resin which has been heated hot in the crosslinking chamber remains still hot at a temperature near the crosslinking temperature upon entry to the expanding chamber. Such high temprature allows the resin to undergo crosslinking during the expanding step, failing to achieve sufficient heat shrinkability. Further, in the practice of the prior art process as described above, it is imperative that the cooling efficiency of the cooling chamber is reduced by the thermal influence of the expanding chamber. Then the cooling chamber must be extended to a sufficient length to increase the overall length of the apparatus, adding to the installation cost.

Since the heat-shrinkable tube is mainly used to cover various pipes and rods or junctions therein as previously described, an adhesive layer is often formed on the interior surface of the tube in order to ensure a bond of the tube to a subject upon covering. One known process for forming an adhesive layer on the heat-shrinkable tube interior surface for such a purpose is by separately applying adhesive to the interior surface of the once formed heat-shrinkable tube. Another approach employs a coextrusion technique in the manufacture of a heat-shrinkable tube wherein adhesive and resin compositions are coextruded to simultaneously form inside and outside layers. Either of these prior art processes for forming an adhesive layer on the heat-shrinkable tube interior surface suffers from many problems. The process of applying adhesive separately from the formation of a heat-shrinkable tube requires an increased number of steps which will add to the manufacturing cost. The two-coat simultaneous extrusion process for simultaneously forming a heat-shrinkable tube and an adhesive layer on the inside thereof relies on a special coextrusion technique requiring relatively expensive extruders and dies. Either of the prior art processes is unsuccessful in continuously producing a heat-shrinkable tube of a crosslinkable resin having an adhesive layer applied inside in an inexpensive efficient manner.

Therefore, a primary object of the present invention is to provide an improved apparatus for continuously producing a heat-shrinkable crosslinked tube in an efficient manner at low cost without incurring any problems as encountered in the prior art processes including the use of a metal insert.

Another object of the present invention is to provide an apparatus for consistently producing a heat-shrinkable crosslinked tube with a predetermined diameter in a steady manner.

A further object of the present invention is to provide an improved apparatus for continuously producing a heat-shrinkable crosslinked tube which can prevent seizing of the tubular resin in a crosslinking cylinder even in the absence of lubricant.

A still another object of the present invention is to provide an apparatus capable of consistently producing a heat-shrinkable crosslinked tube having improved heat stability and shrinkability, the apparatus being of a reduced length contributing to a reduction in overall installation cost.

A further object of the present invention is to provide an apparatus capable of continuously producing a heat-shrinkable tube of crosslinked resin having an adhesive layer applied inside in an inexpensive efficient manner.

SUMMARY OF THE INVENTION

Briefly stated, the present invention provides an apparatus for continuously producing a heat-shrinkable crosslinked resin tube, comprising an extruder head including a die and a mandrel combined therewith for extruding a crosslinkable resin composition into a hollow tube, means associated with the head for introducing a fluid under pressure into the interior of the tube being extruded by the extruder head, a crosslinking cylinder disposed downstream of the extruder head for causing the tubular resin composition to crosslink, an expanding die disposed downstream of the crosslinking cylinder for conducting the tube therethrough and having an interior surface having a continuously increasing diameter in a downstream direction, a cooling cylinder disposed downstream of the expanding die for cooling the tube, guide means disposed downstream of the cooling cylinder for deforming the tube into a flattened form, and means disposed downstream of the guide means for drawing the tube away from the extruder head, wherein a smooth interior surface free of a substantial gap or step extends continuously from the crosslinking cylinder to the cooling cylinder.

With the apparatus of the above-mentioned organization, a crosslinkable or uncrosslinked resin composition from which a heat-shrinkable tube is made is continuously extruded in a hollow tubular form into the crosslinking cylinder through the port between the extruder die and the mandrel. The tube is continuously heated for crosslinking in the crosslinking cylinder and then conducted to the expanding die whose inside diameter continuously and smoothly increases from its inlet contiguous to the crosslinking cylinder to its outlet. The tube is then conducted from the maximum diameter outlet end of the conical die to the cooling cylinder.

Since pressurized fluid is infused into the interior of the tube being extruded, the tube having crosslinked in the crosslinking cylinder, but remaining hot is radially expanded along the interior surface of the expanding die by the action of the pressure fluid. The tube in expanded form is further continuously cooled in the cooling cylinder, obtaining a heat-shrinkable tube.

The interior surface that extends from the crosslinking cylinder to the cooling cylinder is smooth, continuous, and free of a substatial gap or step. As the resinous tube being extruded is conducted from the crosslinking cylinder to the cooling cylinder, the outside surface of the tube is supported by the continuously connected interior surfaces of the respective members. This ensures smooth movement of the tube. If there is any gap or substantial step in a region from the crosslinking cylinder to the cooling cylinder, the pressure fluid introduced in the tube interior for expansion purpose would form local dilations or irregularities at the site, rendering tube movement less smooth to disturb continuous manufacture. Such inconvenience is eliminated by the present invention because the members covering from the crosslinking cylinder to the cooling cylinder provide a smooth and continuous interior surface free of a substantial gap or step.

In a region extending from near the outlet of the extruder head near the inlet of the crosslinking cylinder is disposed means for supplying a friction reducing agent to the outside surface of the tube exiting the extruder head. The friction reducing agent from a supply port reduces the frictional resistance between the the outside surface of the extruded tube and the inside surface of the crosslinking cylinder and prevents resin seizing, ensuring that the extruded tube is smoothly conveyed in a downstream direction to facilitate tube manufacture.

The crosslinking cylinder may be provided on the inside surface with a liner of a material having high releasability from the resin and a low coefficient of friction, for example, fluoride resin. This embodiment enables continuous manufacture of a heat-shrinkable crosslinked tube by facilitating continuous smooth movement of the extruded tube while preventing the resin from adhering to the crosslinking cylinder inside surface, even in the absence of the friction reducing agent mentioned above. This eliminates the inconvenient problems associated with the use of the lubricant mentioned above that some constituents present therein can react with the resin and a loss of lubricant causes seizing. It is, of course, contemplated to supply a friction reducing agent onto the liner inside the crosslinking cylinder.

It is also possible to insert an adhesive supply conduit within the crosslinking cylinder or expanding die. The conduit serves to spray adhesive, typically hot-melt adhesive to the inside surface of the extruded resinous tube to form an adhesive layer thereon in the crosslinking cylinder or expanding die. The provision of an adhesive supply conduit allows continuous manufacture of a heatshrinkable tube having an adhesive layer applied inside using a conventional monolayer extruder without any substantial modification to the extruder and its head.

The guide means may be a nozzle which is disposed downstream of the cooling cylinder, preferably contiguous to the outlet of the cooling cylinder, to circumferentially surround the outside surface of the incoming tube. The nozzle may be shaped like a crevice tool of a vacuum cleaner. More particularly, the nozzle may initially assume a circular inlet cross-section and gradually merge toward an ellipsoidal outlet cross-section. Desirably the nozzle is designed so as to maintain the inside circumferential length constant from its inlet to its outlet. In this embodiment, as the tube from the cooling cylinder is passed through the nozzle, it is deformed into a flattened form without changing its circumferential length. It is to be noted that the fluid is preferably introduced under a pressure of at least 0.1 kg/m² for expansion purpose. Absent a nozzle whose inside circumferential length is constant from its inlet to the outlet, a thin-walled tube will be further expanded past the cooling cylinder by the internal fluid pressure, resulting in a final product having a diameter outside the acceptable range. The use of the nozzle as defined herein ensures that a heat-shrinkable tube having a predetermined size is steadily manufactured.

In proximity to the inlet of the expanding die, there may be provided temperature control means for controlling the temperature of the resinous tube within the range between the crosslinking temperature and the softening temperature of the resin. With this control means, as the tube having passed the crosslinking cylinder is conducted to the expanding die, its temperature is immediately dropped to a level lower than the crosslinking temperature, preventing crosslinking from taking place during and after expansion to reduce heat shrinkability. Since the provision of the temperature control means avoids any influence of the high temperature crosslinking cylinder on the cooling cylinder, the efficiency of the cooling cylinder is increased so that the cooling cylinder can be reduced in length with the benefit of a reduced installation cost. At low temperatures, oil used as the friction reducing agent or lubricant exhibits a poor friction-reducing effect due to high viscosity. With an increased length of the cooling cylinder, the region where the oil remains at a high viscosity is also extended and consequently, the friction resistance is increased to such an extent that continuous pulling of the resinous tube becomes difficult. The difficulty of tube pulling is minimized by reducing the length of the cooling cylinder to reduce the high viscosity oil region.

BRIEF DESCRIPTION OF THE DRAWINGS

The above and other objects, features, and advantages of the present invention will be more fully understood by reading the following description of preferred embodiments taken in conjunction with the accompanying drawings, in which.

DESCRIPTION OF THE PREFERRED EMBODIMENT

Figure 1:
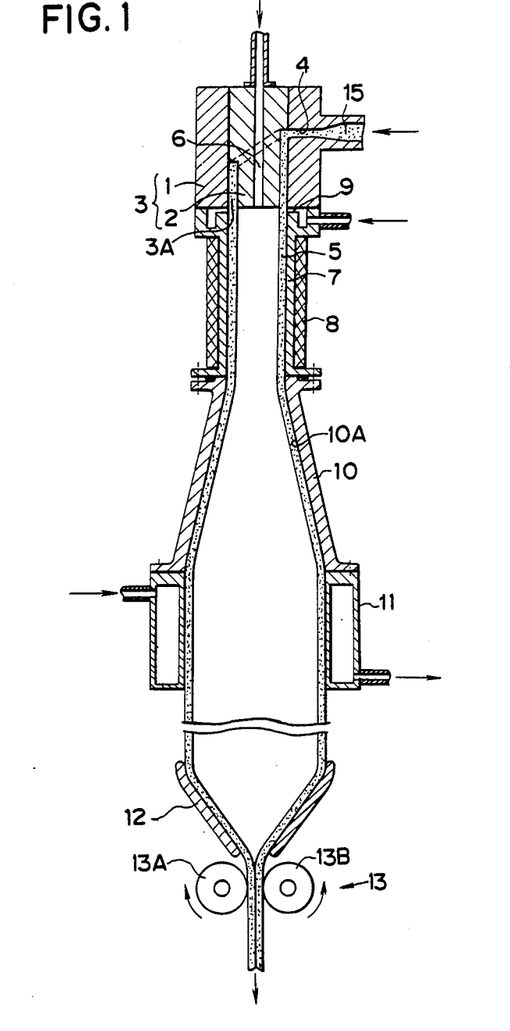
FIG. 1 is a schematic axial cross-sectional view of a continuous tube making apparatus according to one embodiment of the present invention.

Referring to FIG. 1, there is illustrated a continuous tube producing apparatus according to one embodiment of the present invention.

The apparatus includes an extruder head 3 which includes an extrusion die 1 of a generally cylindrical configuration having a vertically extending axis and a generally cylindrical mandrel 2 concentrically disposed inside the die. Between the extrusion die 1 and the mandrel 2 at their lower portion is defined an extrusion port 3A of a continuous annular shape. The extrusion port 3A is in communication with an extruder body (not shown) through a passage 4 for resin material. The extruder forces a cross-linkable resin composition 15 under pressure to the head 3 through the passage 4 to thereby extrude the resin into a hollow tube 5. The mandrel 2 is provided with an axially extending passage 6 for supplying a fluid under pressure from an external source (not shown) into the interior of the tube 5 exiting the port 3A.

The crosslinking cylinder 7 is disposed downstream of the extrusion port 3A in an extruding direction, that is, below the port 3A as viewed in the figure. The crosslinking cylinder 7 has a fixed inside diameter substantially equal to the outside diameter of the extrusion port 3A or the inside diameter of the die 1. The crosslinking cylinder 7 is surrounded by a heater 8 for heating the cylinder and hence, the tube passing therethrough to the crosslinking temperature. Alternatively, the heater 9 may be located inside the crosslinking cylinder 7 and inside the tube 5. At the end of the crosslinking cylinder 7 on the extrusion port 3A side is formed a port 9 for externally supplying a friction reducing agent or lubricant to the inside surface of the crosslinking cylinder 7.

Downstream of the crosslinking cylinder 7 is disposed an expanding die 10 of a frustoconical shape having an inside surface 10A whose diameter continuously increases from the upper or inlet end to the lower or outlet end. The tapered inlet end of the die 10 is directly connected to the crosslinking cylinder 7 in the illustrated embodiment. Downstream of the expanding die 10 is disposed a cooling cylinder 11 which is connected to the dilated outlet end of the die 10 and has an inside diameter equal to that of the die outlet. The cooling cylinder 11 is a straight cylinder equipped with a water or air cooling jacket.

The interior surface which extends from the crosslinking cylinder 7 to the cooling cylinder 11 is a smooth continuous surface which is free of a substantial gap or step.

Downstream of or below the cooling cylinder 11 is disposed guide means 12 for receiving the tube coming down from the cooling cylinder 11 to deform the tube 5 to a flattened cross-section. The guide means 12 includes a nozzle which circumferentially surrounds the outside surface of the tube exiting the cooling cylinder and is designed such that it initially assumes a circular inlet cross-section and gradually merges toward an ellipsoidal outlet cross-section. Downstream of or below the guide means 12 is disposed drawing means 13 in the form of a pair of rollers 13A, 13B for drawing downward the flattened tube 5 from the guide 12 while compressing it on opposite sides. The drawing means 13 provides both a driving force for pulling down and a compressive force. Downstream of the drawing means 13 is disposed a winding roll (not shown). The winding roll may be located below or aside the drawing rollers.

Using the above-mentioned apparatus, a heat-shrinkable crosslinked tube may be fabricated from a crosslinkable resin composition, typically polyethylene by the following procedure.

The crosslinkable resin composition 15 is compounded and milled in the extruder section (not shown) and then forced to the head 3 through the passage 4 whereupon it is continuously extruded through the port 3A between the die 1 and the mandrel 2 into a hollow tube 5 within the crosslinking cylinder 7. A fluid under pressure, preferably an inert gas is blown through the fluid passage 6 into the interior of the tube being extruded. Also, a friction reducing agent is supplied through the port 9 and applied between the outside surface of the tube 5 and the inside surface of the crosslinking cylinder 7. The friction reducing agents generally include liquids, finely divided solids or powder and gases. Those generally known as lubricants are liquids such as silicone oils, polyether oils and other lubricating oils and finely divided solids such as boron nitride (BN) powder and molybdenum disulfide ($MoS_2$) powder. Such gases as inert gases including nitrogen gas may also be used. As previously described, the use of oily lubricants is sometimes undesirable and in such a case, gases such as inert gas may preferably be used as the friction reducing agent.

The tube 5 of uncrosslinked resin being extruded into the crosslinking cylinder 7 as described above is progressively moved downward through the crosslinking cylinder 7 under gravity as well as by the pulling force of the rotating press rollers 13A, 13B coupled with the winding force of the winding roll (not shown). During passage through the cylinder 7, the tubular resin undergoes thermal crosslinking. At this stage, the tube 5 is forced against the inside surface of the crosslinking cylinder 7 by the expanding force of the pressure fluid while the friction reducing agent externally applied serves to reduce the frictional resistance between the crosslinking cylinder 5 inside surface and the tube 5 outside surface so that the extruded tube is moved downward smoothly without incurring seizing or adherence to the cylinder.

The thus crosslinked resin tube 5 then passes through the expanding die 10. At this point, the tube 5 is still hot so that it may be expanded along the divergent inside surface 10A of the die 10 by the expanding force of the pressure fluid, progressively increasing the diameter. The thus inflated tube 5 reaches the cooling cylinder 11 where it is cooled to near room temperature, resulting in a heatshrinkable crosslinked tube. Since the interior surface extending from the crosslinking cylinder 7 to the cooling cylinder 11 is smooth, continuous and free of a gap, dip or step as described above, the tube can be smoothly moved downward without forming any local protrusion or irregularity under the fluid pressure for expansion.

Thereafter, the tube 5 is deformed or narrowed by the nozzle 12 and completely flattened out by the pressing rollers 13A, 13B whereupon the flattened tube is wound on the roll (not shown). Compression of the tube 5 by the pressing rollers 13A, 13B forms a gas-tight seal against the interior space of the tube portion upstream of the rollers so that the fluid pressure may be effectively utilized for expansion.

Figure 2:
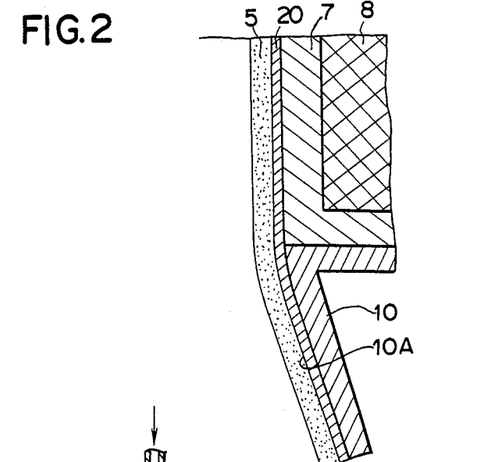
FIG. 2 is an enlarged cross-sectional view of a portion of the crosslinking cylinder and expanding die having a liner lying thereon in the present apparatus.

FIG. 2 illustrates an embodiment wherein a liner 20 is formed on the inside surface of the crosslinking cylinder 7 and the expanding die 10. The liner 20 is of a material having a high releasability from the resin composition of which the tube is made and a low coefficient of friction. Illustrative liner materials include fluoride resins such as polytetrafluoroethylene (PTFE) and ceramics. The liner 20 may be formed by coating a fluoride resin or similar lining material or inserting a preformed liner into the related members.

The liner 20 prevents the tubular resin from being cured to the inside surface of the crosslinking cylinder and reduces the frictional resistance between the crosslinking cylinder 7 and the expanding die 10. Thus, the use of the liner 20 can omit the use of the friction reducing agent, which in turn eliminates the supply port 9 in FIG. 1. Of course, it is contemplated to provide the liner 20 and at the same time, to supply the friction reducing agent from the port 9.

Figure 3:
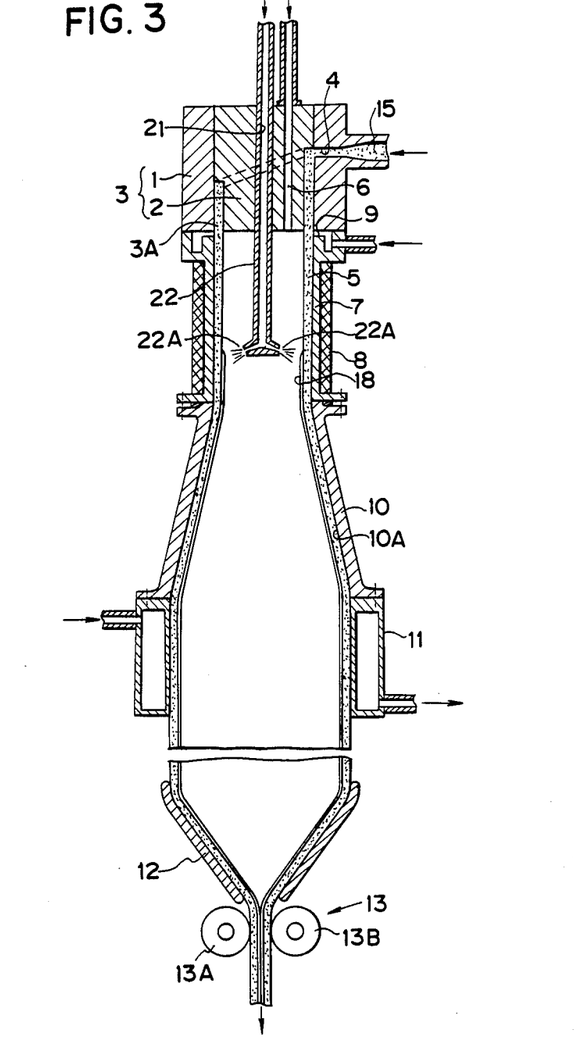
FIG. 3 is a schematic axial cross-sectional view similar to FIG. 1 of a continuous tube making apparatus according to another embodiment of the present invention wherein an adhesive supply conduit is provided.

Another preferred embodiment is shown in FIG. 3, which is approximately the same as in FIG. 1 where like parts are designated by like numerals. In this embodiment, the pressure fluid supply passage 6 is formed in the mandrel 2 off the center axis, but parallel to the axis. At the axis of the mandrel 2 is formed another through-hole 21 through which a conduit 22 extends and terminates within the crosslinking cylinder 7 for externally introducing an adhesive. The adhesive conduit 22 has a plurality of spray orifices 22A at its distal end. In the illustrated embodiment, the spray orifices 22A are disposed within the crosslinking cylinder 7.

When a heat-shrinkable tube is produced using the apparatus of FIG. 3, an adhesive, typically a hot-melt adhesive in molten state is sprayed through the orifices 22A of the conduit 22 onto the interior surface of the tube 5 being extruded from the head 3 to the crosslinking cylinder 7, thereby forming an adhesive layer 23 on the tube interior surface. The adhesive layer 23 is then cooled and hardened by the cooling cylinder 11. There can be continuously produced a heat-shrinkable crosslinked tube having an adhesive layer on its interior surface.

Although adhesive is sprayed inside the crosslinking cylinder 7 in the embodiment shown in FIG. 3, the adhesive conduit 22 may be extended further downward so that the orifices 22A are positioned inside the expanding die 10 whereby adhesive is sprayed onto the tube interior surface in the range of the expanding die.

Figure 4:
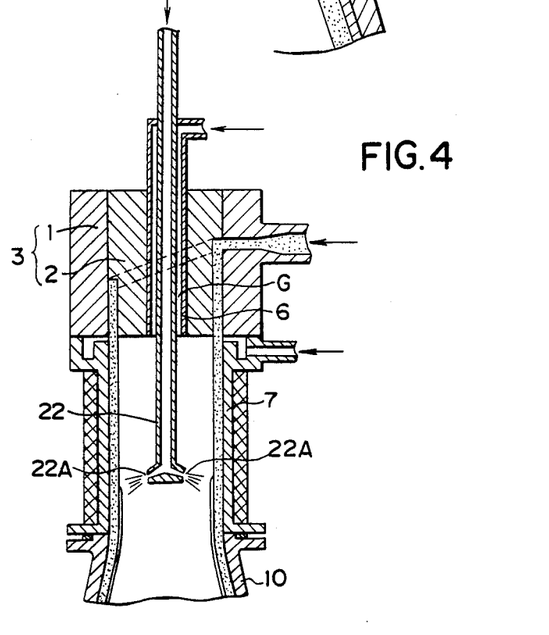
FIG. 4 is a cross-sectional view of another arrangement of the adhesive supply conduit.
Figure 5:
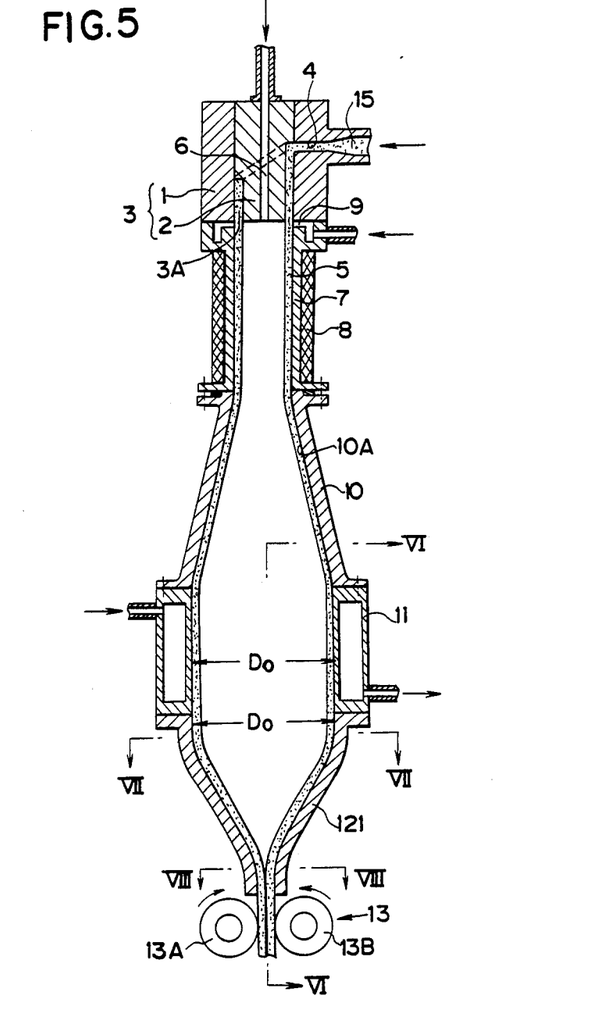
FIG. 5 is a schematic axial cross-sectional view similar to FIG. 1 of a continuous tube making apparatus according to a further embodiment of the present invention wherein an exit nozzle is provided.

FIG. 4 illustrates another arrangement of the pressure fluid supply passage and the adhesive supply conduit. The pressure fluid supply passage 6 extends in alignment with the center axis of the mandrel 2 and the adhesive supply conduit 22 is concentrically disposed within the passage 6 with a gap G therebetween.

FIGS. 5 to 9 illustrate another preferred embodiment which is particularly suitable in making a thin-walled heat-shrinkable tube. This embodiment uses a nozzle 121 as the guide for deforming the tube 5 from the cooling cylinder into a flattened form. The nozzle 121 surrounds the entire circumference of the tube 5.

Figures 6, 7, 8, 9:
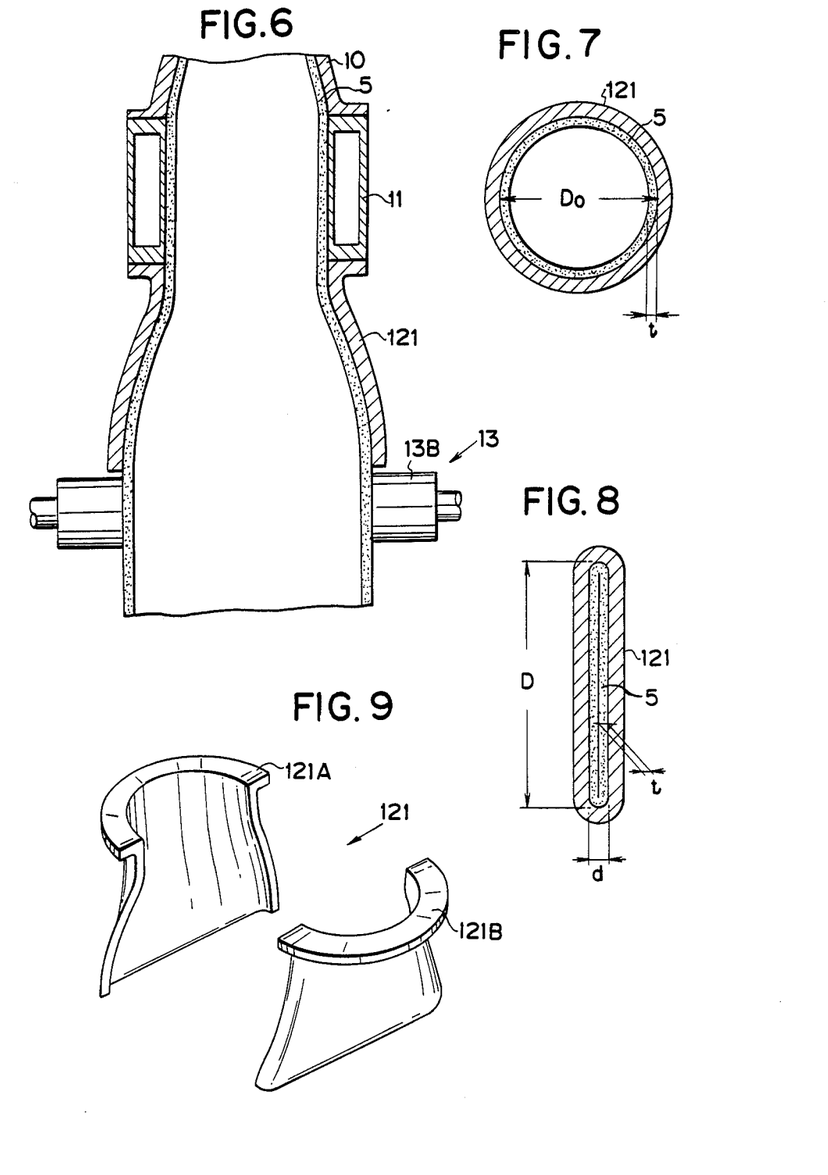
FIG. 6 is an axial cross section of the nozzle portion taken along lines VI—VI in FIG. 5.
FIG. 7 is a lateral cross section of the nozzle portion taken along lines VII—VII in FIG. 5.
FIG. 8 is a lateral cross section of the nozzle portion taken along lines VIII—VIII in FIG. 5.
FIG. 9 is a perspective view of split segments of the nozzle used in the apparatus of FIG. 5.

More particularly, the nozzle 121 is a combination of segments 121A, 121B which are split along a vertical plane including a center axis as shown in FIG. 9. The nozzle 121 has an upper or inlet end located contiguous with the lower or outlet end of the cooling cylinder 11. The interior shape of the nozzle 121 in a horizontal cross section, that is, a cross section perpendicular to the center axis is such that the nozzle assumes the same circular cross-section at the inlet as the adjoining cooling cylinder 11 (FIG. 7) and gradually merges into an ellipsoidal cross-section toward the lower or outlet end. At the most downstream outlet end, the nozzle has an ellipsoidal cross section which is shown in FIG. 8 as having a pair of straight parallel sides connected by semi-circular sides. As best shown in FIG. 8, the ellipsoidal cross section has a minor diameter d corresponding to twice the wall thickness t of the tube, the minor diameter being a distance between the pair of straight sides. The nozzle 121 is designed such that its inside circumferential length in a horizontal cross-section is maintained constant or the same as that of the cooling cylinder 11 from its inlet to its outlet. More particularly, when the cooling cylinder 11 has an inside diameter DO, the nozzle 121 has an inside diameter equal to DO at its inlet as shown in FIG. 7 and hence, an inside circumferential length equal to DO. The inside circumferential cross-section of the nozzle 121 gradually and smoothly merges from a circular shape at its inlet to an ellipsoidal shape at its outlet while maintaining the inside circumferential length equal to $\pi$DO. The inside ellipsoidal cross-section of the nozzle 121 at its outlet has a minor diameter d equal to 2t and a major diameter D equal to $[\pi(DO/2-t)+2t]$ as understood from FIG. 8 (lubricant film thickness is negligible).

In this embodiment, the tube 5 exiting the cooling cylinder 11 is immediately introduced into the nozzle 121 where it is deformed from a circular to an ellipsoidal cross-section and eventually to a flattened shape in accordance with the transition of the inside circumferential cross-section of the nozzle 121. Since the inside circumferential length of the nozzle 121 is maintained at the fixed value from its inlet to its outlet, the tube 5 is guided downward with its circumferential length kept constant, eliminating the likelihood that the circumferential length of the tube be increased by the expanding internal fluid pressure after it exits the cooling cylinder 11. This ensures that a heat-shrinkable tube having a fixed diameter can be consistently and steadily produced.

Figure 10:
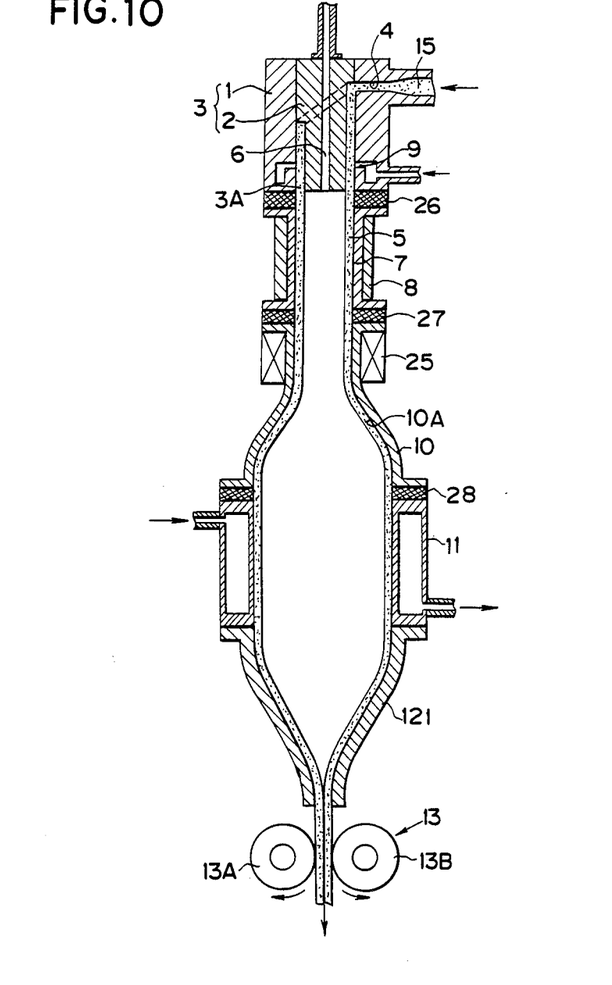
FIG. 10 is a schematic axial cross-sectional view similar to FIG. 1 of a continuous tube making apparatus according to a further embodiment of the present invention wherein insulators are interposed between the members.

A still further preferred embodiment is shown in FIG. 10 wherein temperature control means in the form of a cooling water jacket 25 for maintaining the tube 5 at a temperature lower than the crosslinking temperature, but higher than the softening point of the resin is provided at an upper portion of the expanding die 10, that is, near the inlet of the expanding die. In addition, between the outlet of the extruder head die 1 and the inlet of the crosslinking cylinder 7, between the outlet of the crosslinking cylinder 7 and the inlet of the expanding die 10, and between the outlet of the expanding die 10 and the inlet of the cooling cylinder 11 are interposed heat insulators 26, 27, and 28 for interrupting heat transfer therebetween, respectively. The heat insulators may be of a low heat conductivity material such as ceramics. Of course, the connection of an insulator between two adjoining members provides a smooth and continuous interior surface.

Figure 11:
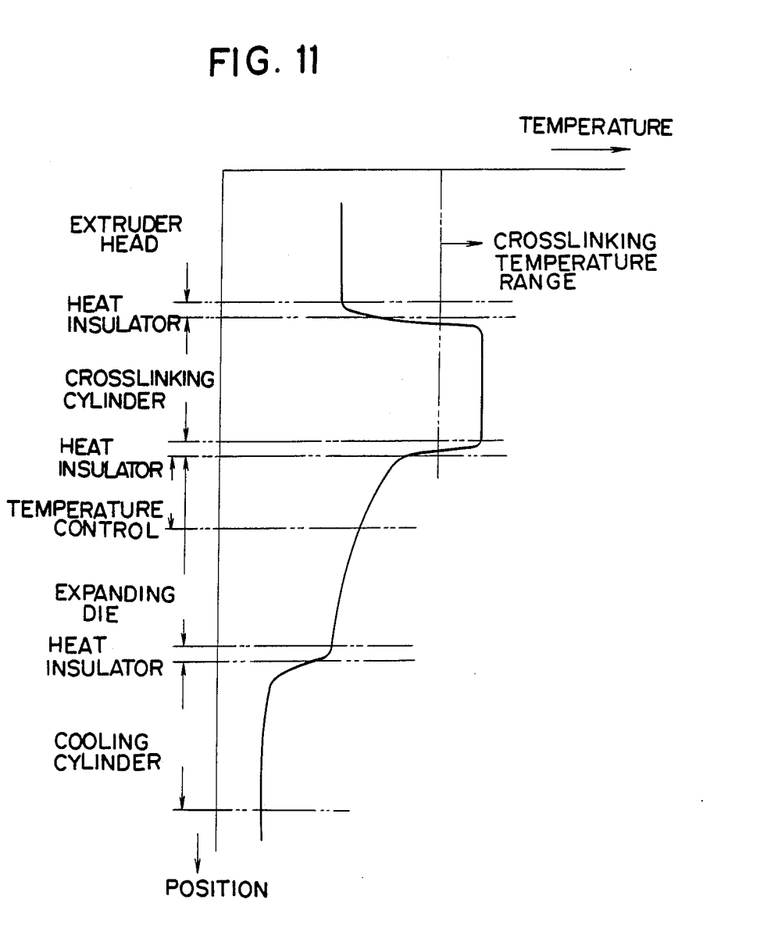
FIG. 11 is a diagram showing the temperature profile of a tube-forming resin observed making a heat-shrinkable tube using the apparatus of FIG. 10.
Figure 12:
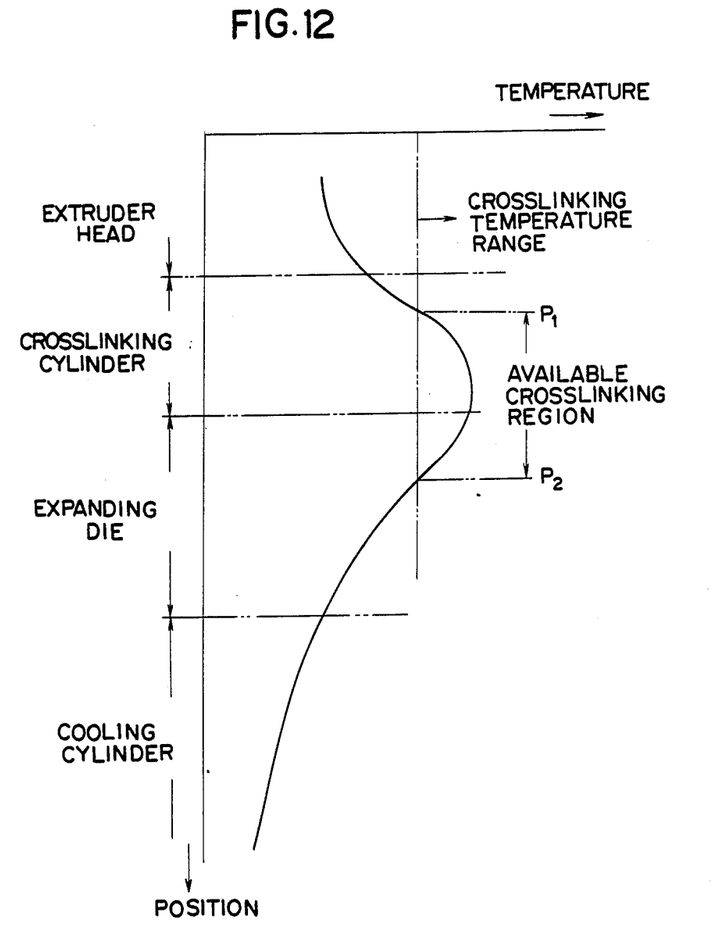
FIG. 12 is a diagram showing the temperature profile of a tube-forming resin observed in making a heat-shrinkable tube using an apparatus of FIG. 10 with the insulators omitted.

FIG. 11 diagrammatically illustrates the profile of temperature appearing at various positions in a resin extruding direction when a heat-shrinkable tube is produced from a crosslinkable resin using the apparatus of FIG. 10. For comparison purposes, FIG. 12 diagrammatically illustrates a similar temperature profile in a resin extruding direction when a similar heat-shrinkable tube is produced using an apparatus of the same construction as in FIG. 10 except that the heat insulators 26, 27, 28 and the temperature control means 25 are omitted. It is to be noted that the latter construction is within the scope of the present invention.

As will be evident from FIG. 12, in the embodiment where the heat insulators 26, 27, 28 and the temperature control means 25 are excluded, the temperature of the tubular resin is somewhat increased at the stage prior to the extrusion from the head 3 under the thermal influence of the heating or crosslinking cylinder 7. The temperature is gradually increased to the crosslinking temperature range as the tube is advanced from the head 3 to the crosslinking cylinder 7, and then moderately decreased under the influence of the cooling cylinder 11 as the tube is advanced from the crosslinking cylinder 7 to the cooling cylinder 11 through the expanding die 10. As a result, the region where crosslinking actually takes place does not overlap the region that extends from the inlet to the outlet of the crosslinking cylinder 7, but usually a region that extends from a position P1 located somewhat downstream of the inlet of the crosslinking cylinder 7 to a position P2 located somewhat downstream of the inlet of the expanding die 10. This is herein referred to as available crosslinking region. If the lower end P2 of the available crosslinking region is located more downstream, then crosslinking can take place during and even after expansion of the tube in the flare die 10, probably resulting in a tube having an insufficient degree of heat shrinkability. The thermal influence of the crosslinking cylinder 7 can cover the zone of the cooling cylinder 11 which can be reduced in cooling efficiency. In order to fully cool the tubular resin to a low temperature, the cooling cylinder 11 must be extended as appropriate. Extension of the cooling cylinder 11 means that a region where lubricant oil used as the friction reducing agent has a high viscosity is extended, which imposes an undesirably increased frictional resistance against pulling-down of the resinous tube. Further, since the resin is heated prior to its exit from the outlet of the extruder head 3 under the thermal influence of the crosslinking cylinder 7 as previously mentioned, the resin is rather liable to scorching or seizing within the extruder head 3.

In contrast, the most preferred embodiment shown in FIG. 10 wherein the heat transfer between the extruder head 3, crosslinking cylinder 7, expanding die 10, and cooling cylinder 11 is blocked by the heat insulators 26, 27, and 28 can fully eliminate any thermal influence between the members. In addition, the temperature control means 25 in proximity to the inlet of the expanding die 10 can properly control the temperature of the expanding die 10. Therefore the available crosslinking region is limited substantially within the zone of the crosslinking cylinder 7. More particularly, as shown in FIG. 11, the resin is not substantially heated until it exits the extruder head 3. The tubular resin undergoes a sudden rapid temperature rise to the crosslinking temperature as it enters the cross-linking cylinder 7, then a rapid temperature drop as it exits the crosslinking cylinder 7 and enters the expanding die 10, and a further temperature drop to the desired low temperature as it enters the cooling cylinder 11. This can avoid the likelihood that crosslinking might proceed during and after the expanding step as experienced in the embodiment shown in FIG. 12, ensuring that the resulting tube has a sufficient degree of heat shrinkability. The improved efficiency of the cooling cylinder 11 allows the cooling cylinder to be shortened, reducing the overall length of the apparatus. The reduced length of the cooling cylinder 11 leads to the reduced region where lubricant oil used as the friction reducing agent has a high viscosity, providing a reduced frictional resistance which facilitates smooth pulling of the resinous tube. Since it is prevented that the resin in the extruder head 3 is heated under the thermal influence of the crosslinking cylinder 7, there occurs no scorching prior to crosslinking.

It will be understood that the insulators 26, 27, 28 shown in FIG. 10 may be replaced by forced cooling means, for example, cooling jackets with equal results. It is also possible to provide a cooling jacket within the extruder die in order to prevent scorching thereat.

The temperature profile is given below as optimum in producing a heat-shrinkable tube from a crosslinkable polyethylene resin composition. The resin is at a temperature of about 125° C. in the extruder head 3, heated to a temperature of about 250° C. for crosslinking in the crosslinking cylinder 7, then cooled for inflation in the expanding die 10 to a temperature of higher than the softening point of 115° C., but lower than 150° C., and then cooled to below about 60° C. in the cooling cylinder 11.

Although the illustrated embodiments are of vertical type, the present apparatus may be constructed in a horizontal form wherein a tube is extruded and pulled horizontally.

As understood from the foregoing description, the apparatus of the present invention can continuously produce a heat-shrinkable tube from a crosslinkable resin in a smooth manner without experiencing any difficulty in tube pulling, and is thus most suitable in the continuous manufacture of a length of heat-shrinkable tube. Because of no necessity of finally removing a metal insert as required in the prior art apparatus wherein a resinous tube is extrusion coated on a tubular metal insert, the apparatus of the invention can efficiently produce such a tube at a low cost and is useful in the commercial manufacture of a heat-shrinkable crosslinked resin tube in a mass-production scale.

We claim:

1. An apparatus for continuously producing a heat-shrinkable crosslinked resin tube, comprising
    an extruder head including a die and a mandrel combined therewith for extruding a crosslinkable resin composition into a hollow tube,
    means associated with said extruder head for introducing a fluid under pressure into the interior of the tube being extruded by said extruder head,
    a crosslinking cylinder disposed downstream of said extruder head for causing the tubular resin composition to cross-link by continuously heating said tube,
    an unheated expanding die disposed immediately downstream of said crosslinking cylinder for conducting the tube therethrough without further application of heat and having an interior surface having a continuously increasing diameter in a downstream direction,
    a cooling cylinder disposed immediately downstream of said expanding die for cooling the tube,
    guide means disposed downstream of said cooling cylinder for deforming the tube into a flattened form, and
    means disposed downstream of said guide means for drawing the tube away from said extruder head,
    wherein a smooth non-perforated interior surface free of a substantial gap or step extends continuously from said crosslinking cylinder to said cooling cylinder.

2. The apparatus of claim 1 wherein said fluid introducing means comprises a passage in the mandrel through which the fluid under pressure is passed.

3. The apparatus of claim 1 which further comprises means disposed in a region extending from near the exit of said extruder head to near the inlet of said crosslinking cylinder for supplying a friction reducing agent to the outside surface of the tube just exiting said extruder head.

4. The apparatus of claim 1 wherein said crosslinking cylinder has a liner on its inside surface, said liner being of a material having high releasability from the resin and a low coefficient of friction.

5. The apparatus of claim 1 wherein said guide means comprises a nozzle disposed downstream of said cooling cylinder for circumferentially surrounding the outside surface of the tube exiting the cooling cylinder, wherein said nozzle initially assumes a circular inlet cross-section and gradually merges toward an ellipsoidal outlet cross-section.

6. The apparatus of claim 5 wherein said nozzle is disposed contiguous to the exit of said cooling cylinder and designed so as to maintain the inside circumferential length constant from the inlet to the outlet.

7. The apparatus of claim 1 wherein said drawing means comprises a pair of rollers adapted to rotate in pressure contact while clamping the flattened tube on opposite sides.

8. The apparatus of claim 1 which further comprises temperature control means disposed in proximity to the inlet of said expanding die for maintaining the tube passing therethrough at a temperature which is lower than the crosslinking temperature, but higher than the softening temperature of the resin composition.

9. The apparatus of claim 1 wherein at least one set of members selected from the combinations of the die of said extruder head and said crosslinking cylinder, said crosslinking cylinder and said expanding die, and said expanding die and said cooling cylinder are connected via a heat insulation for interrupting heat transfer therebetween.

10. The apparatus of claim 1 wherein at least one set of members selected from the combinations of the die of said extruder head and said crosslinking cylinder, said crosslinking cylinder and said expanding die, and said expanding die and said cooling cylinder are connected via means for forcedly cooling the tube passing therethrough.

11. The apparatus of claim 1 which further comprises means disposed inside said crosslinking cylinder or expanding die for spraying an adhesive to the inside surface of the tube.

* * * * *